D. E. PARIS.

Cooking-Stove.

No. 6,465. Reissued June 1, 1875.

Attest:
Geo. H. Graham
H. L. Perine.

Inventor:
Daniel E. Paris.

N. PETERS, PHOTO-LITHOGRAPHER, WASHINGTON, D. C.

UNITED STATES PATENT OFFICE.

DANIEL E. PARIS, OF TROY, NEW YORK.

IMPROVEMENT IN COOKING-STOVES.

Specification forming part of Letters Patent No. 113,086, dated March 28, 1871; Reissue No. 6,465, dated June 1, 1875; application filed May 21, 1875.

*To all whom it may concern:*

Be it known that I, DANIEL ELDON PARIS, of Troy, of the county of Rensselaer and State of New York, have invented certain new and useful Improvements in Cooking-Stoves, of which the following is a specification:

These improvements are fully set forth hereinafter, reference being had to the accompanying drawings, in which—

Figure 1:
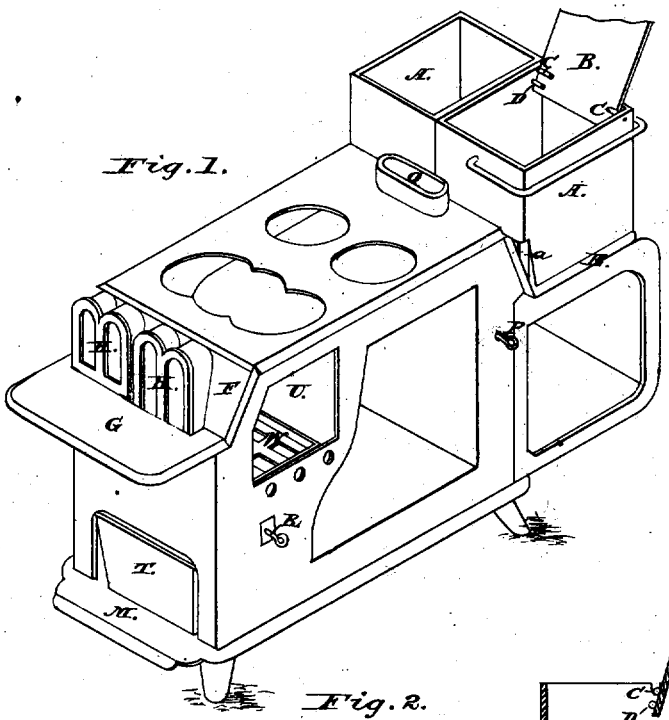
Figure 2:
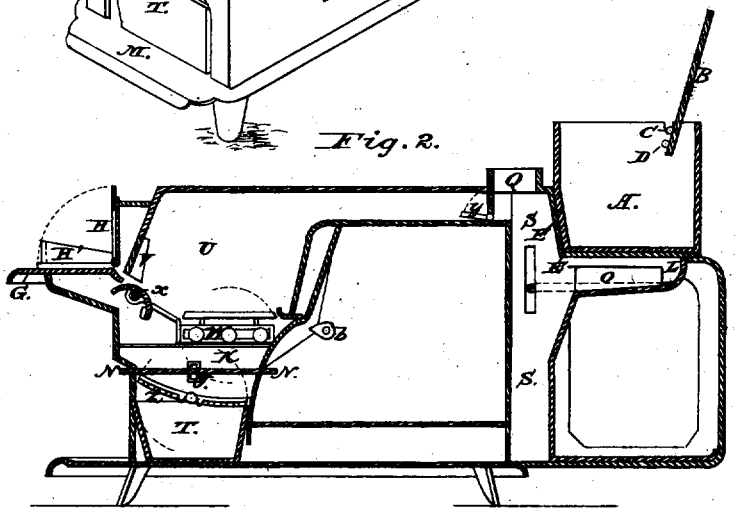
Figure 3:
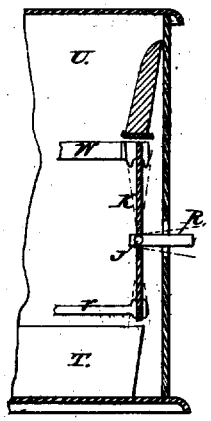

Figure 1 is a perspective view of the stove. Fig. 2 is a vertical side view, taken through the center, front to rear. Fig. 3 is a vertical section, taken through the fire-box lengthwise, showing one end only of the same.

My present invention relates to the front part of the stove; and consists of a fire-grate and ash-pan, the one above the other, together with a sifting-grate intervening, arranged not only to vibrate horizontally, but to dump and discharge its contents into the pan below.

My fire-grate lies loosely upon upright rocker-pieces K K. (Seen in Figs. 2 and 3.) These pieces, placed at either end of the fire-box, support the fire-grate, while they themselves are supported by journals, cast or formed on either end of the same, (seen at N N in Fig. 2,) at or near their center, horizontally. The rear journals N pass into or through the front oven-plate, while those at the front pass into or through the lower front plate of the stove, and are thus held and supported in their position. It will be seen that they not only support the fire-grate W on their tops, but uphold and support the coal-screen or sifting-grate Z on or by their bottom edges; and as both the fire-grate W and the sifting-grate Z are attached to these rocker-pieces or plates K, it follows that when the shaker R is inserted into one of these rocker-pieces, as seen at J in Fig. 3, and is moved up and down, as shown by the dotted lines each side of the shaker R, both the fire-grate and sifting-grate are vibrated horizontally, as seen by the dotted lines in Fig. 3. Both the fire-grate W and the sifting-grate Z are made to dump or turn on central journals, as seen by the circular dotted lines in Fig. 2.

I take the ash-pan T out of the stove, and after it is taken out and emptied of its ashes it can be replaced, and the sifting-grate can then be dumped and its contents discharged into the pan. Thus the coals which pass through the fire-grate, which should be coarse or open, so that the fire will burn freely, are all saved and separated from the ashes by the intervening sifting-screen Z.

It will be seen from Figs. 2 and 3 that I make my sifting-grate to hang dependent in the chamber below the fire-grate—that is, it hangs suspended inside the stove and under the fire-grate. The fact that the grate itself also lies on, or is upheld by, the same supports does not alter the principle by which I support the sifting-screen Z, which is, as it were, like a hammock, hanging suspended in the chamber below the fire-grate.

Having thus described my invention, I claim—

1. A sifting-grate located in the body of a cooking-stove and below the fire-grate, the former arranged to dump and discharge its contents into the pit below.

2. In combination with an ash-pan and fire-grate, a dumping and sifting grate or coal-screen, intervening between the two and located within the body of a stove.

3. In combination with a fire-grate, a sifting-grate or coal-screen, located within the body of a cooking-stove, constructed to vibrate horizontally and to dump and discharge its contents.

4. For a stove, a sifting-grate or coal-screen located directly or perpendicularly below a fire-grate, and, in combination therewith, the sifting-grate, being arranged to dump and discharge its contents.

5. In combination with a fire-grate, a sifting-grate or coal-screen located lower down than the fire-grate, and resting upon vibrating supports, one end or one side of which moves with the screen as it vibrates, for the purpose of screening the coals that may fall upon it.

6. For a sifting-grate, a support or supports constructed to sustain the sifting-grate, one end or one side of which supports is attached to a stove, while the other end or side vibrates with the grate, the whole in combination with a fire-grate located in the stove over or above the sifting-grate.

DANIEL E. PARIS.

Witnesses:
R. H. WHITTLESEY,
R. D. O. SMITH.